United States Patent [19]

Wada et al.

[11] 4,277,165

[45] Jul. 7, 1981

[54] PHOTOCOPYING MACHINE EQUIPPED WITH VARIABLE MAGNIFICATION ARRANGEMENT

[75] Inventors: Kenichi Wada; Hiroshi Murasaki, both of Sakai; Yuji Enoguchi, Higashi Osaka; Takao Fujiwara, Toyakawa, all of Japan

[73] Assignee: Minolta Camera Kabushiki Kaisha, Osaka, Japan

[21] Appl. No.: 8,565

[22] Filed: Feb. 1, 1979

Related U.S. Application Data

[63] Continuation of Ser. No. 885,015, Mar. 9, 1978, abandoned.

[30] Foreign Application Priority Data

Mar. 16, 1977 [JP] Japan .................................. 52/29495

[51] Int. Cl.³ .............................................. G03B 27/52

[52] U.S. Cl. .......................................... 355/55; 355/72

[58] Field of Search ..................................... 355/55, 72

[56] References Cited

U.S. PATENT DOCUMENTS

| | | | |
|---|---|---|---|
| 3,674,366 | 7/1972 | Callahan | 355/55 |
| 3,779,642 | 12/1973 | Ogawa et al. | 355/55 |
| 4,011,012 | 3/1977 | Kawai | 355/55 |

*Primary Examiner*—Richard A. Wintercorn
*Attorney, Agent, or Firm*—Wenderoth, Lind & Ponack

[57] ABSTRACT

A photocopying machine equipped with a variable magnification arrangement including a cassette containing large-size copy paper and positioned to permit lengthways transport of copy paper through the machine and a cassette containing small-size copy paper and positioned to permit sideways transport of copy paper through the machine. The cassettes comprise actuation elements which actuate different combinations of switches in a control circuit, which in response causes adjustment of positions of photocopying machine elements for production of photocopies of different magnifications and causes selective forwarding of copy paper of the required size from a cassette.

6 Claims, 10 Drawing Figures

PHOTOCOPYING MACHINE EQUIPPED WITH VARIABLE MAGNIFICATION ARRANGEMENT

This is a continuation of application Ser. No. 885,015 filed Mar. 9, 1978 now abandoned.

The present invention relates to a photocopying machine permitting production of copies at different magnifications of original documents to be copied. More particularly, the invention relates to a photocopying machine wherein different size sheets of copy paper are automatically selected and used in accordance with the selected magnification of photocopies.

Paper used for office purposes is generally classified into different sizes. For example, according to Japanese Industrial Standards, paper size is classed as A series or B series, and within each series, successively higher numbers represent successive reductions to ½ of the paper area. The invention is described below in reference to A series and B series paper sizes according to these standards, it being understood that the principles of the invention apply when paper having sizes classified in other series is employed.

In designing a photocopying machine, there are contradictory requirements relating to the mode of transport of copy paper in the machine. For example, in order to reduce the time required to obtain a copy, it is advantageous to move copy paper sideways through the machine. On the other hand, if it is required to obtain a copy at a magnification of 1 of an original document having a size B3 (365×515 mm), sideways transport of copy paper through the machine demands use of a photosensitive drum having a length of at least 515 mm, and of associated elements such as image transfer means and drum charging or cleaning means which are correspondingly large. Thus, from considerations of the length of time required to obtain photocopies and of the size of the photocopying machine elements, the photocopying machine design should preferably be such that copy paper of a certain maximum size is transported lengthwise through the machine, but copy paper which has a size, for example, less than ½ this maximum size is transported sideways, or widthwise through the machine.

Another problem associated with copy paper transport is presented when the photocopying machine is equipped with means for adjustment of lens system elements, speed of original document scanning elements, etc., in order to permit copies of various magnifications to be obtained. When, for example, as illustrated in FIG. 1, it is required to obtain a copy N which is ½ the size of an original document M, if a sheet of copy paper N which is exactly the correct size for obtaining a photocopy at reduced magnification is moved sideways through the machine, in order to make the required photocopying time less, the result is that portions L' of the copy paper are not used and also a portion N' of the original document is not reproduced. In conventional means, to ensure that a complete copy is obtained in copying at reduced magnification, it has been a general practice to use sheets of copy paper having the same size as original documents of maximum size, but this results in waste of copy paper, since the resultant copied image at the reduced magnification occupies only a portion of the copy paper sheet, with other portions of the sheet not being utilized for the copying. On the other hand, if all the copy paper sheets of different sizes are to be transported lengthwise through the copying machine, the copying speed is reduced due to the increase of distance through which the copy paper sheet is to be fed, although the waste of the copy paper as described above may be eliminated. On the other hand, if all the copy paper sheets of different sizes are to be fed sideways through the copying machine, the size of the copying machine itself may undesirably be increased due to the necessity of increasing the mechanical durability of each of the components of the copying machine for obtaining copies of the maximum size.

Accordingly, an essential object of the present invention is to provide a photocopying machine equipped with a variable magnification arrangement in which the entire surface of a copy paper sheet is fully utilized without any portion thereof being wasted during variable magnification copying, with improvements of various factors such as copying speed and mechanical durability of the copying machine being simultaneously taken into consideration.

Another important object of the present invention is to provide a photocopying machine of the above described type which is simple in construction and operation, and accurate in functioning for efficient copying operation, with substantial elimination of the disadvantages inherent in the conventional photocopying machines of this kind.

A further object of the present invention is to provide a photocopying machine of the above described type which is compact in size and can be manufactured at low cost.

In accomplishing these and other objects, according to the present invention, there is provided a photocopying machine provided with a variable magnification arrangement wherein copy paper sheets of the required size are selected and transported through the machine in a manner ensuring optimum compromise between the requirements for reducing the time necessary for obtaining photocopies, while avoiding the necessity of large equipment, and also ensuring avoidance of waste of copy paper when photocopies at reduced magnification are obtained. To permit this selection of copy paper according to the present invention, the photocopying machine is equipped with a variable magnification arrangement wherein two or more cassettes which contain photocopy paper of different sizes, are disposed to permit copy paper to be moved sideways or lengthways through the machine, and which have associated therewith forwarding means which are selectively actuated in response to a selection made by a user to effect production of photocopies of various magnifications.

A better understanding of the present invention may be had from the following full description of a preferred embodiment thereof when read in reference to the attached drawings, in which like numbers indicate like parts, and in which FIG. 1 is a schematic top plan view explanatory of different dispositions of copy paper with respect to a photosensitive drum;

Figure 8A:
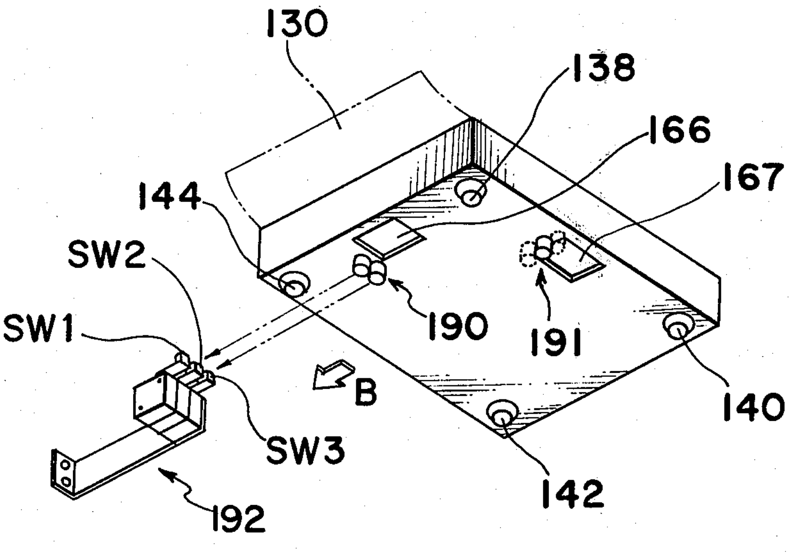
Figure 8B:
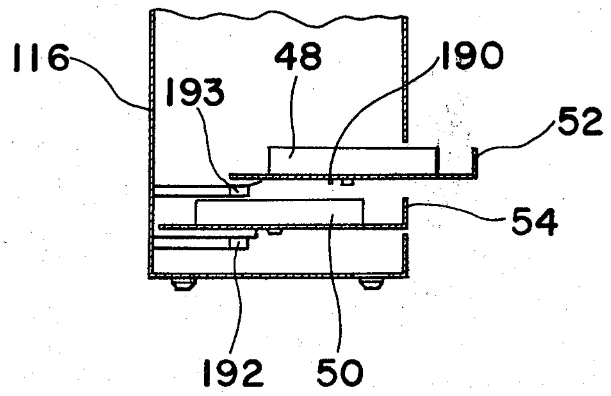
Figure 9:
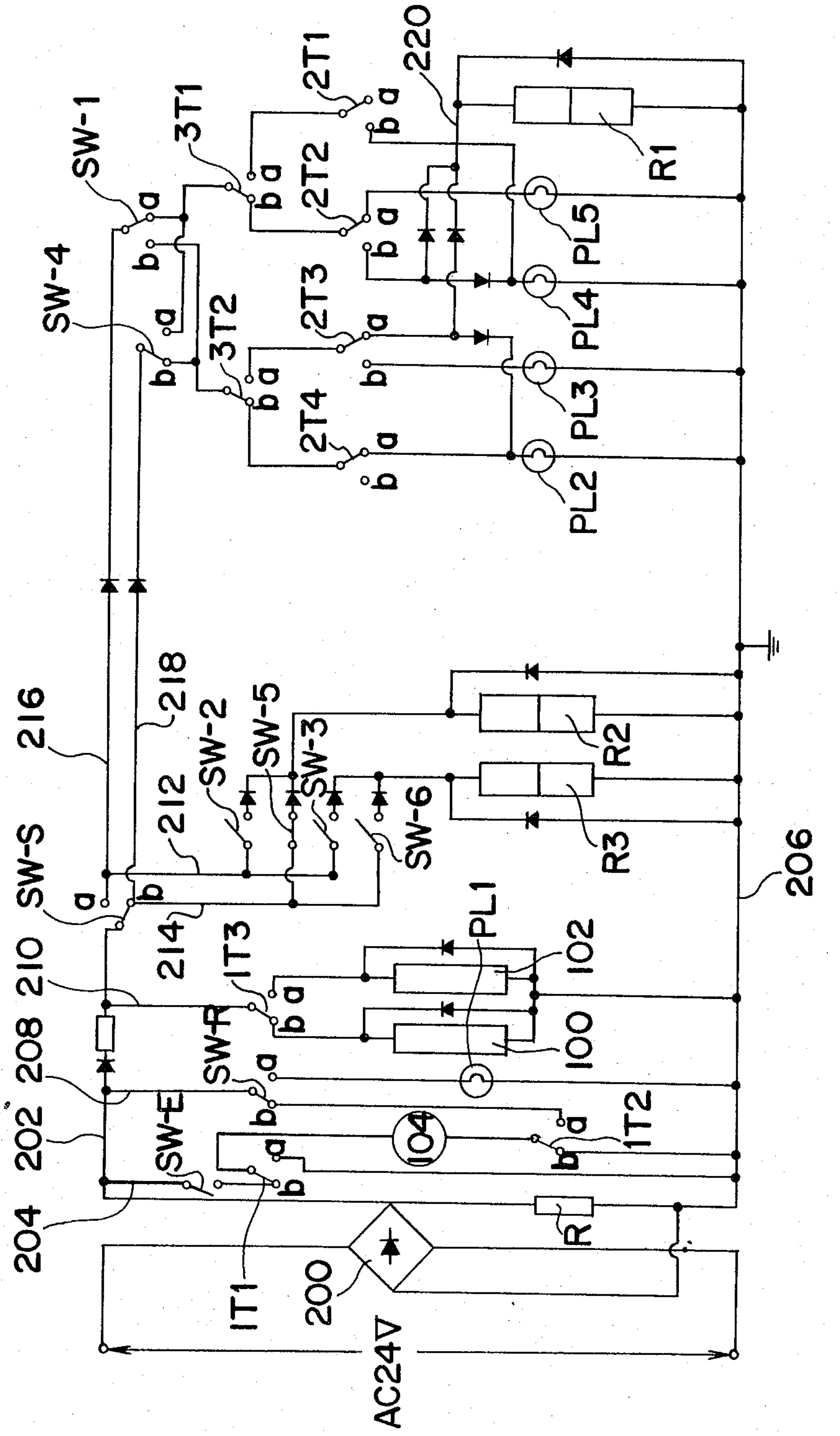

FIG. 8(*a*) and FIG. 8(*b*) are drawings showing the relation of switches and switch actuation elements when copy paper cassettes are set in the photocopying machine; and FIG. 9 is an electrical circuit diagram of a copy paper selection and motor control circuit.

Figure 1:
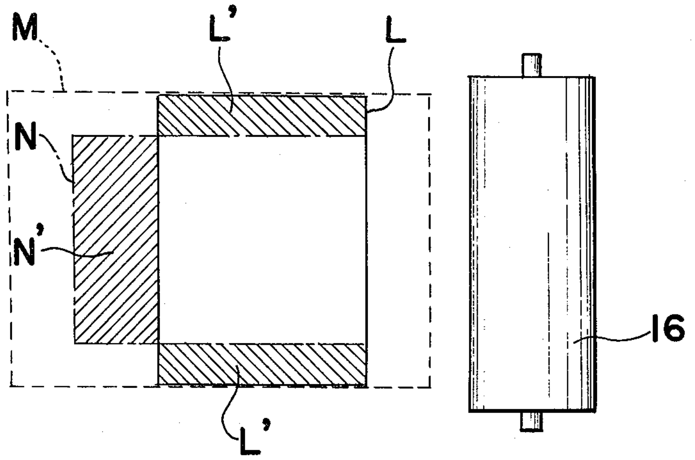
Figure 2:
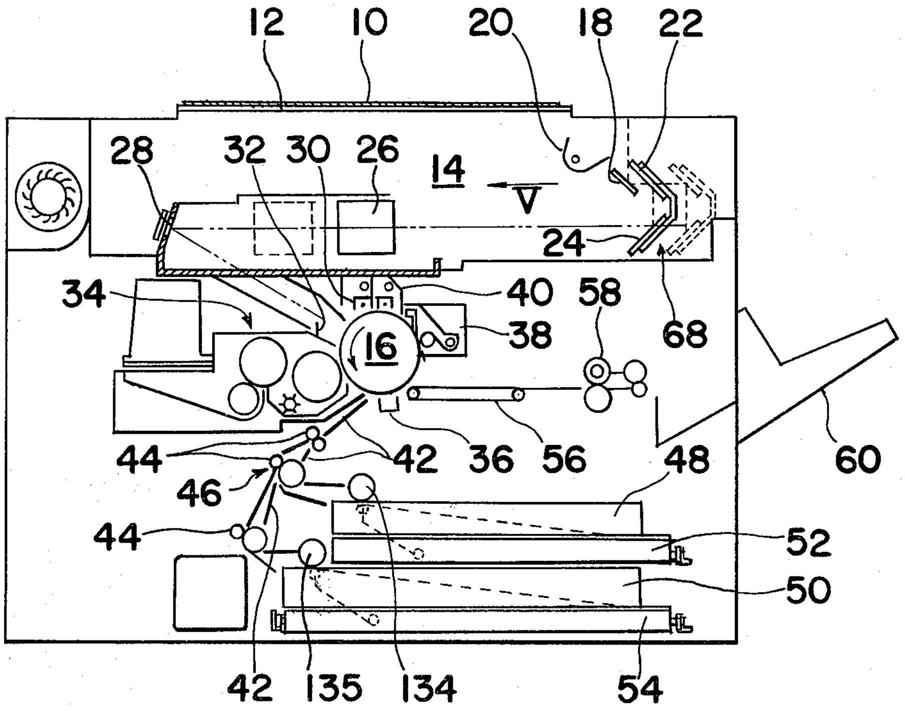
FIG. 2 is cross-sectional view of a photocopying machine equipped with a variable magnification arrangement according to the invention.

Referring to FIG. 2, there is shown a photocopying machine equipped with a variable magnification arrangement of the invention which includes, on the upper wall portion thereof, a horizontally disposed transparent document rest 12 for support of an original document 10 to be copied, image light from which may be directed by an optical system 14 onto a photosensitive drum 16 located in a generally central portion of the photocopying machine. The optical system 14 further includes a first mirror 18 and a light source 20 which are moved together at a speed V in the direction indicated by the arrow in the drawing, in order to scan successive portions of the documents 10 on the support 12, a second mirror 22 and a third mirror 24, which are moved in the same direction at a speed ½ V, and a lens assembly 26 and a fourth mirror 28, which are fixed, the photosensitive drum 16 being rotated, during scanning of the document 10, counterclockwise as seen in the drawing, and image light from successively scanned portions of the document 10 being directed onto successive peripheral portions of the drum 16 by the optical system 14.

As the drum 16 rotates, the peripheral surface thereof is successively brought past an electrical charging unit 30, an exposure station 32, whereat image light from the document 10 is directed onto the surface of the drum 16 by the optical system 14, a dry-type developer unit 34, which directs onto exposed portions on the surface of the drum 16, charged toner particles which adhere to the drum 16 in an image-defining pattern, a transfer station whereat there is provided a transfer charger 36 and the toner particles are transferred onto copy paper brought into contact with the surface of the drum 16 by a system described below, and a cleaning unit 38 and an erasing unit 40 which respectively clean off remnant toner particles and remove remnant electrical charge from the drum 16.

For a general understanding of the arrangement according to the present invention it is to be noted here that the photocopying machine of the invention includes at least a first cassette accommodating therein the copy paper sheets of a first size which is equivalent to the maximum size, a second cassette accommodating therein the copy paper sheets of a second size the long side of which is less than the short side of the copy paper sheet of the maximum size, and first and second cassette holders provided on the main body of the photocopying machine. The first cassette holder receives thereon the first cassette lengthways with respect to the direction of transportation of the copy paper sheets, while the second cassette holder selectively receives thereon the second cassette lengthways on sideways with respect to the direction of the transportation of the copy paper sheets so that the second cassette is placed on the second holder sideways for copying at equal size magnification and lengthways for copying at reduced size magnification with respect to the direction of transportation of the copy paper sheets.

More specifically, the copy paper is selected from one of the two supply cassettes 48 and 50, which are provided in a lower portion of the photocopying machine, the selected copy paper being moved to the transfer station by a transport system 46 defined by guide elements 42 and rollers 44 comprising separate branches leading to the separate supply cassettes 48 and 50. The supply cassettes 48 and 50 are suitably in a stacked arrangement, since this permits easy connection of both cassettes to the transport system 46 and also makes construction compact. The copy paper is moved from the cassette 48 to the associated branch of transport system 46 by a feed roller 134. A feed roller 135 is provided in association with the cassette 50 for the same purpose. After passing the transfer station, the copy paper is moved by a transport means 56 and forwarding heat rolls 58 to a tray 60 provided on an outer wall of the photocopying machine.

Figure 3:
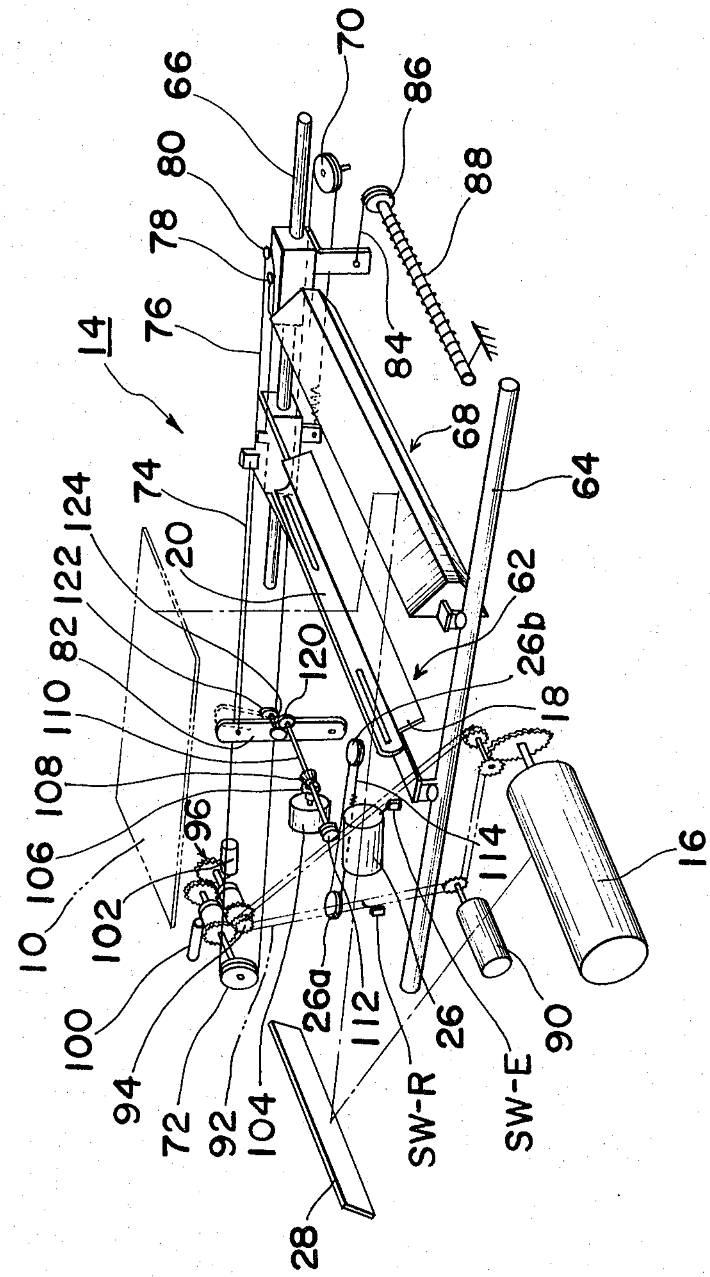
FIG. 3 is a perspective view of the optical system of the machine of FIG. 2.

The optical system 14 of the photocopying machine is shown in greater detail in FIG. 3, to which reference is now had. The first mirror 18 and the light source 20 constitute a first scanning system 62 which is slidable along parallel guide bars 64 and 66 provided horizontally in a left to right disposition as seen in the drawing. Movement of the first scanning system 62 is effected by a first wire 74 which has one end fixedly attached to the first scanning system 62, and is passed around a pulley 70 mounted on a fixed portion of the photocopying machine at the right of the optical system 14, and then around a drive transmission pulley 72 at the left of the optical system 14, and has the opposite end also fixedly attached to the first scanning system 62. The second mirror 22 and third mirror 24 constitute a second scanning system 68 which is provided to the right of the first scanning system 62 and is also slidably supported on the guide bars 64 and 66. The second scanning system 68 is connected to the first system 62 by a second wire 76, which has one end attached to the first scanning system 62, is passed successively round pulleys 78 and 80 mounted on the second scanning system 68, and having the opposite end attached to the upper end of a conjugate length compensation lever 82 having the lower end pivotally mounted on a pin attached to a fixed portion of the photocopying machine on the left of the first scanning system 62. The second scanning system 68 is also connected via a third wire 84 and pulley 86 to a return spring 88, which exerts a constant force to return the second system 68 and hence the first scanning system 62 to initial positions.

Power to drive the above-described scanning systems is supplied by a main motor 90, shown near the photosensitive drum 16 in the lower portion of FIG. 3. On the output shaft of main motor 90 there is provided a fixedly attached gear which drives chain 92 which transmits drive to gear elements for causing rotation of drum 16 and to a gear 94 connected to a changeover clutch means 96 which is constituted as a combination of two mechanical clutches having different drive transmission ratios and transmits drive to the above-mentioned drive transmission pulley 72 connected via the first wire 74 to the first scanning system 62. Change-over of the clutches in clutch means 96 is effected in a known manner by solenoids 100 and 102. More specifically, only the solenoid 100 is energized when a photocopy having the same size as the original document is required, at which time the first scanning system 62 is moved at a speed V, and only the solenoid 102 is energized when a photocopy at reduced magnification is required, at which time the speed of the first scanning system 62 is increased to $\sqrt{2}$ V. The drum 16 is always rotated at the same speed, and the ratio of the speed of the second scanning system 68 to the speed of the first scanning system 62 is 1:2. When scanning is completed and transmission of the drive to the scanning systems is no longer required, the drive from the main motor 90 continues to be supplied to the drum 16, but both of the solenoids 100 and 102 are de-energized, whereupon the spring 88 is able to return the scanning systems 62 and 68 to initial positions.

In order to change the degree of magnification of the photocopies, as well as changing the speed at which the original document 10 is scanned, it is also necessary to change conjugate length of the scanning systems and the position of the lens assembly 26 relative to the original document 10 and photosensitive drum 16. For this purpose, there is provided a reversible drive motor 104 which is shown in a generally central portion of FIG. 3 to the left of the first scanning system 62 and of the above-mentioned conjugate length compensation lever 82, and on the output shaft thereof there is fixedly mounted a bevel gear 106 which engages a bevel gear 108 fixedly mounted on a rotatable shaft 110 which is disposed at right-angles to the line of movement of the scanning systems 62 and 68 and has a pulley 112 fixedly mounted on one end thereof and a gear 120 fixedly mounted on the opposite end thereof, the pulley 112 and gear 120 thus being rotated, clockwise or counterclockwise, upon actuation of the motor 104.

A wire 114 has one end fixedly attached to the left-hand side of the lens assembly 26, is led leftwards from the lens assembly 26, is passed around a pulley **26*a* rotatably supported by a fixed portion of the photocopying machine, then is led rightwards, passed at least one complete turn around the pulley 112 on the shaft 110, led further rightwards, and passed around a pulley 26*b* which is rotatably supported by a fixed portion of the photocopying machine level with the pulley 26*a* and is located to the right of the lens assembly 26, and then is led leftwards, the opposite end of the wire 114 being attached to the right-hand side of the lens assembly 26**.

When the motor 104 is actuated to rotate the pulley 112 clockwise, the lens assembly 26 is moved rightwards to a position suitable for production of photocopies of equal size to an original document, and when this position is reached, the lens assembly 26 contacts and opens a switch SW-E, and thus actuation of the motor 104 and hence the movement of the lens assembly 26 are stopped. If a photocopy of reduced magnification is required, the motor 104 is actuated to cause the lens assembly 26 to be moved leftwards, and when the lens assembly 26 reaches a required position it contacts and causes switching of a switch SW-R and actuation of the motor 104 is again atopped. The switches SW-E and SW-R are provided in a control circuit which is described in greater detail below.

The above-mentioned gear 120 mounted on one end of shaft 110 engages a gear 124 fixedly mounted on one end of a rotatably supported shaft on the opposite end of which is fixedly mounted a cam 122. An upper end portion of the lever 82 is maintained constantly in contact with the cam 122 by spring means (not shown). When the motor 104 is actuated to move the lens assembly 26 to the right-hand position for obtaining photocopies of equal magnification, the cam 122 is rotated to a position in which a large diameter portion thereof contacts the lever 82, whereby the lever 82 is moved to the position indicated by the solid line portion of the drawing, and the second scanning system 68 is moved, counter to the force of the spring 88 on the right of the second scanning system 68, to a position in which it is comparatively close to the first scanning system 62. When the motor 104 is actuated to bring the lens assembly 26 to the left-hand position for production of photocopies of reduced magnification, the cam 122 is rotated to a position in which a small diameter portion thereof contacts the lever 82, and the spring 88 is able to move the second scanning system 68 to a position which is comparatively remote from the first scanning system 62.

Figure 4:
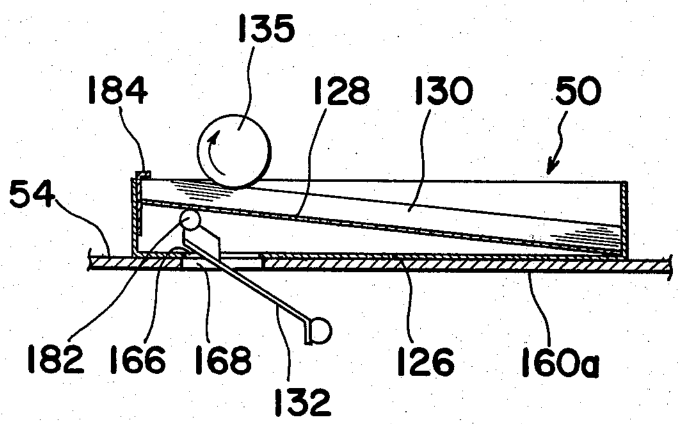
FIG. 4 is a cross-sectional view of a copy paper cassette and cassette holder.

An example of the copy paper cassettes employable in the copy paper supply system is shown in FIG. 4, to which reference is now had. The copy paper cassette 50, for example, containing sheets of copy paper 130 is detachably fitted in a cassette holder 54, which constitutes a portion of the photocopying machine. The copy paper 130 in the cassette 50 is supported on a support board 128 which is of a size such that it is inclined with respect to the bottom wall 126 of the cassette 50 when it is fitted in the cassette 50. In the cassette bottom wall 126, there is provided an opening 166 which is near an edge portion of the cassette 50 and which, when the cassette 50 is fitted in the cassette holder 54, comes into line with an opening 168 provided in the bottom of the holder 54 near an edge portion thereof. A spring-loaded lever 132 which extends through the openings 168 and 166 and has attached to the upper end thereof a roller 182 which presses against the lower surface of the copy paper support board 128, normally exerts a force to press the support board 128 and copy paper 130 thereon upwards, to bring the edge portion of the uppermost sheet of copy paper into contact with the above-mentioned forwarding roll 135, which is held stationary in a predetermined position on the side of the photocopying machine and serves to forward paper into a branch of the transport system 42 shown in the lower portion of FIG. 2. The purpose of the roll 182 at the end of lever 132 is to lower frictional resistance. It should be noted here that the copy paper forwarding roller 135, although held stationary at the predetermined position during the feeding of the copy paper, is arranged to be retracted from said predetermined position during exchanging of the cassettes by a mechanism not shown. It should also be noted that the concept of the present invention is not limited in its application to the cassettes of the above-described type alone, but may readily be applicable to any other similar types of cassettes.

Figure 5:
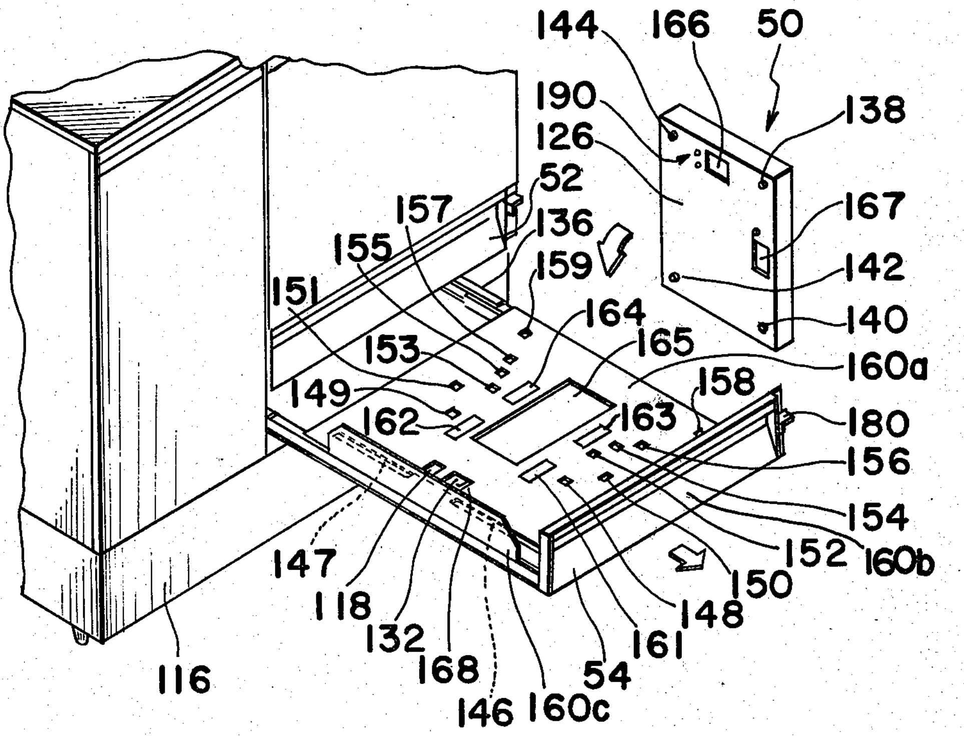
FIG. 5 is a perspective view showing the disposition of cassette positioning elements and switch actuation elements provided on a copy paper cassette and cassette holder.

Referring now to FIG. 5, the cassette holder 54 comprises a base **160*a*, an outer wall 160*b*, which, when the holder 54 is inserted in the photocopying machine serves to prevent entry of dust, etc., into the holder 54, and a cassette positioning side wall 160*c*, the function on which is described below. Attached to the sides of the base 160*a* which are at right-angles to the outer wall 160*b* there are provided slide bar elements which are slidable in slide guide elements 136 provided in the main body 116 of the photocopying machine, whereby the holder 54 and cassette 50** contained therein can be moved into or out of the photocopying machine.

In the central portion of the base **160*a*, there is defined a comparatively large opening 165 through which the user can manually push on the cassette accommodated in the holder 54**, in order to remove the cassette.

Around central opening 165, there are provided magnetic plates 161, 162, 163, and 164 which serve to hold a cassette in the holder 54. The earlier described opening 168 through which the spring-loaded lever 132 passes is provided near the cassette positioning wall 160*c*. Adjacent to the opening 168, there is provided a recess 118 for allowing switch actuation elements to project through the base 160*a*. The switch actuation elements, which are attached to a copy paper cassette and described hereinafter, control the circuit by accommodating the switches disposed in the photocopying machine when the holder 54 is inserted in the photocopying machine. In the area of the cassette holder base 160*a* which is between the openings 168 and 118, there are provided cassette positioning grooves 146 and 147 which are parallel to the cassette positioning wall 160*c*. In the upper surface of the base 160*a*, there are provided positioning holes 148, 149, 150, 151, 152, 153, 154, 155, 156, 157, 158 and 159, which are arranged in pairs on opposite sides of the central opening 165. For example, the positioning holes 150 and 151 are disposed symmetrically with respect to the center of the base 160*a*, the positioning holes 154 and 155 form a similar pair, and so on. When the cassette is mounted in the holder 54, studs described later and attached to the cassette engage a particular pair of positioning holes.

Still referring to FIG. 5, in addition to the earlier described opening 166 in the bottom wall 126 near one edge portion thereof, each cassette has a similar opening 168 near an adjacent edge. Adjacent to the opening 166, there is provided a set of switch actuation elements 190, and a different set of switch actuation elements 191 is provided adjacent to the opening 167. Also, each cassette has on the bottom wall 126 thereof projecting studs 138, 140, 142 and 144 which are located near corner portions of the cassette bottom wall 126. The opening 166 is between the studs 138 and 144, and the opening 167 is between studs 138 and 140.

Figure 6:
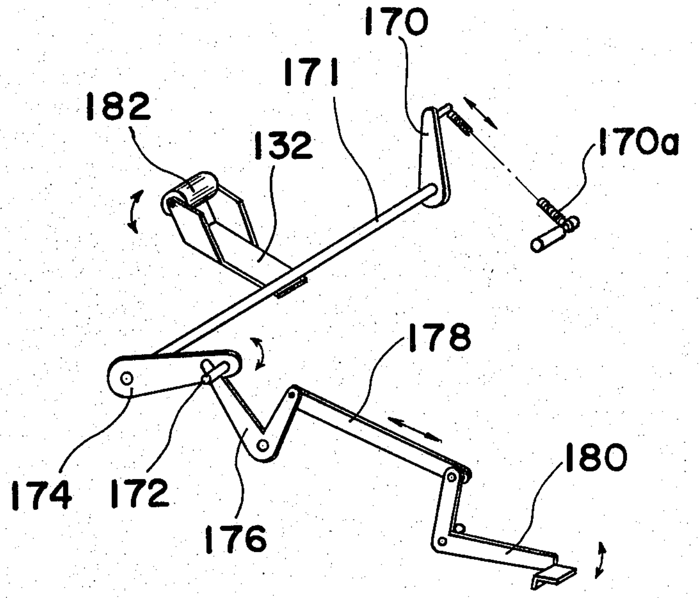
FIG. 6 is a perspective view of pressure means for exerting pressure on copy paper in a cassette and means for disengaging said pressure means.

On the outer wall 160*b* of the holder 54, there is provided lever means comprising an externally actuable lever 180 for causing lowering of the spring-loaded lever 132 from the opening 168 in the cassette holder base 160*a* and a corresponding opening in the cassette, in order to permit easy loading or unloading of the cassettes into or from the holder 54. As shown in FIG. 6, this lever means comprises a straight pivotal lever 170 one end of which is connected to one end of a bar 171, the central portion of which is connected to the lower end of lever 132, and one end of which has connected thereof to a spring means 170*a* which exerts a constant force to turn lever 170 clockwise as seen in the drawing and cause the bar 171 to push the lever 132 upwards. The other end of the bar 171 is connected to one end of a straight pivotal lever 174. To the other end of straight lever 174, there is fixed a pin 172, which projects sideways from the lever 174 and is in sliding contact with the outer end of one arm of a pivotally mounted two-arm lever 176. The outer end of the other arm of lever 176 is pivotally attached to one end of a connecting rod 178, the other end of which is pivotally attached to the outer end of a pivotally mounted two-arm lever 180. The outer end of the other arm of the lever 180 projects from the outer wall 160*b* of the holder 54, and is externally actuable to cause the lever 180 to pivot clockwise as seen in the drawing. With this construction, when no external pressure is applied on the lever 180, the spring means 170*a* acts to cause the lever 132 to press against the board 128 in a cassette, as shown in FIG. 4, and gradually move upwards as copy paper is removed from the cassette. When, however, the external end of the lever 180 is pressed downwards, the lever 180 and lever 176 are pivoted clockwise, the lever 176, acting via the pin 172, causes the lever 174 to pivot counterclockwise, and the bar 171 is moved counter to the force of the spring means 170*a* in a direction to move the lever 132 downwards, clear of the openings in the cassette and cassette holder 54.

Figure 7:
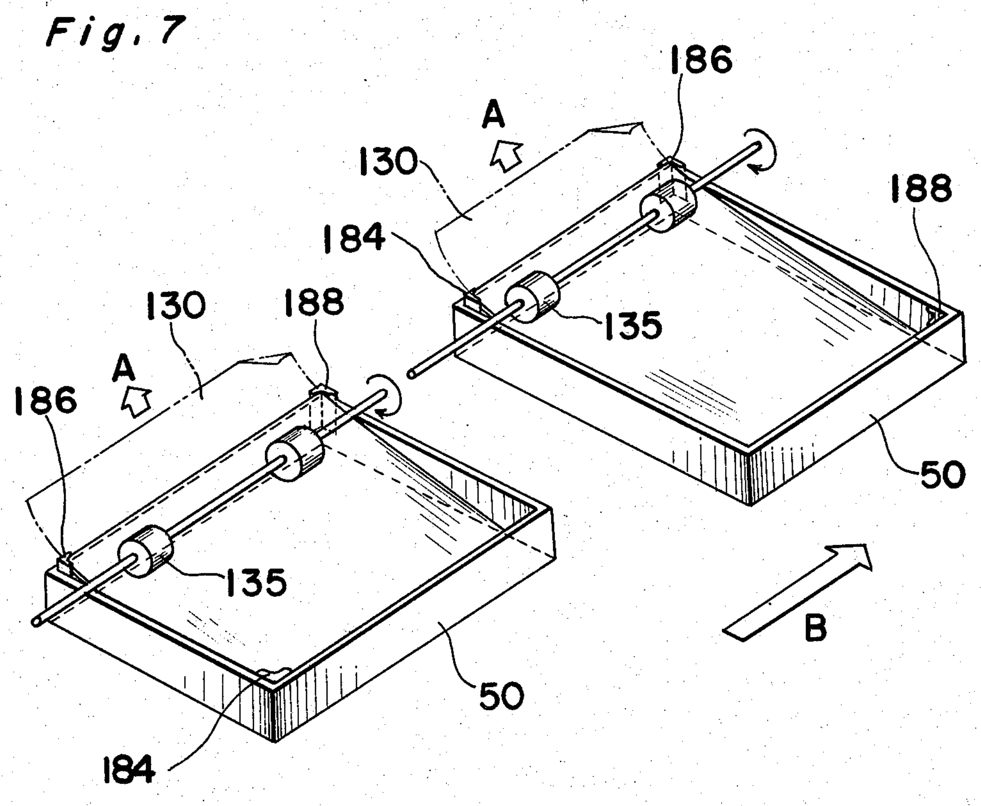
FIG. 7 is a perspective view showing the copy paper cassettes during use.

Referring now to FIG. 7, in which the arrows A indicate the direction of forwarding of the copy paper from the cassettes and the arrow B indicates the direction of insertion of the cassettes into the photocopying machine, the cassettes can be mounted with respect to the forwarding roll means so that the copy paper is forwarded lengthways or sideways therefrom, and each cassette 50 has provided, at three corners thereof, copy paper sheet multi-feeding preventing members or stop pawl elements 184, 186 and 188 which are movable upwardly or downwardly with respect to the cassette, and serve to prevent forwarding of more than one sheet of copy paper at a time from the cassette.

Referring back to FIG. 5, and also referring to FIG. 8(*a*) and FIG. 8(*b*), to fit a cassette 50 into the cassette holder 54, the cassette is placed in the holder 54 in a manner such that the side wall thereof near which the opening 166 or 167 is provided is brought into contact with the positioning wall 160*c* of the holder 54. If it is required to effect lengthways transport of the copy paper through the photocopying machine, the cassette is placed so that the opening 166 is nearer the positioning wall 160*c*. For sideways transport of copy paper through the photocopying machine, the opening 167 is positioned nearer the positioning wall 160*c*. Referring particularly to FIG. 8(*a*), and taking the example in which the opening 166 is located nearer the positioning wall 160*c*, in this case, the studs 138 and 144 fit into grooves 146 and 147, respectively, and the studs 140 and 142 fit into the positioning holes 154 and 155, respectively, so as to hold the cassette in a position in which the opening 166 in the cassette is brought into alignment with the opening 168 in the holder base 160*a*, and the switch actuation elements 190 actuate particular switches in the set of the switches 193 provided in the main body of the photocopying machine as shown in FIG. 8(*b*). If the opening 167 of the cassette is positioned nearer the positioning wall 160*c*, the studs 140 and 138 engage the grooves 146 and 147, respectively, the studs 142 and 144 engage the positioning holes 150 and 151, respectively, the opening 167 is positioned in line with the opening 168, and the set of the switch actuation elements 191 actuates a particular set of switches 192 provided in the main body of the photocopying machine as shown in FIG. 8(*b*), the combination of the switches actuated by the actuation elements 191 being different from the combination of the switches actuated by the switch actuation elements 190. As noted above, the positioning holes 148 through 149 in the base 160*a* of the cassette holder 54 are in a plurality of pairs. The pairs of the positioning holes other than the holes 150 and 151 and holes 154 and 155 serve in a similar manner for positioning of the cassettes containing copy paper of different sizes. Each cassette has associated therewith sets of switch actuation elements such as described above, each set of the switch actuation elements being constructed to actuate a particular combination of the switches. In other words, the cassette holder 54 can accommodate different cassettes containing copy paper of various required sizes, and a given cassette can be positioned to permit lengthways or sideways transport of the copy paper through the photocopying machine, and for a particular setting of a particular cassette, one particular combination of the switches is actuated. More specifically, the switch actuation elements 190, for example, contact the group of switches 192 including the switches SW-1, SW-2 and SW-3 which is provided on the main body of the photocopying machine when the cassette 50 placed on the cassette holder 54 is inserted into the main body of the photocopying machine, thus detecting the size of the copy paper sheets and orientation of the cassette and effecting the changing over of the magnification through an electrical circuit described later with reference to FIG. 9. It is to be noted that another group of switches 193 including the switches SW-4, SW-5 and SW-6 is also provided for the upper cassette holder 52 and have a similar function as shown in FIG. 8(*b*). In this embodiment of the invention, the set of switches thus actuable includes the switches SW-1 to SW-6 as described above, and copy paper sizes employed are A3, B4, A4, and B5. A cassette containing smaller size copy paper can be placed in the upper position in a disposition to permit sideways transport of the copy paper, while a cassette containing larger size copy paper can be placed in a disposition permitting lengthways transport of the copy paper. Depending on whether a copy paper cassette containing copy paper of one of these sizes is placed in the upper position or lower position in the stacked arrangement shown in FIG. 2, the combination of switches actuated by the switch actuation elements attached to the lower surface thereof is as indicated in Table 1 below.

TABLE 1

| Size | Upper position | Lower position |
|---|---|---|
| A3 | SW-1, SW-2 | SW-4, SW-5 |
| B4 | SW-3 | SW-6 |
| A4 | SW-2 | SW-5 |
| A3 to A4 reduction | SW-2, SW-3 | SW-5, SW-6 |
| B5 | SW-1, SW-3 | SW-4, SW-6 |
| B4 to B5 reduction | SW-1 | Sw-4 |

The above-described switches SW-1 to SW-6 and switches SW-E and SW-R are part of a motor control and cassette selection circuit shown in FIG. 9, to which reference is now had. In this circuit, the terminals a of various switches shown are terminals onto which the respective switches close when actuated, and the terminals b of these switches are the terminals on which the respective switches close when they are unactuated. Power to the circuit is supplied from an AC 24 V source after rectification thereof by a diode bridge circuit 200, full-wave rectified voltage appearing across a resistor R. The upper terminal of the resistor R is connected to a line 202 and the lower terminal thereof to a line 206 connecting to ground. The line 202 leads, via a diode and a suitable resistor to a cassette selection switch SW-S, which is movable by external action to an upper terminal a connected to lines 216 and 212 or to a lower terminal b connected to lines 214 and 218.

Referring back to FIG. 2, the selection switch SW-S is actuated by the user to select the upper cassette 48 or the lower cassette 54 in photocopying machine, and is moved to the upper terminal a in order to select the upper cassette 48, at which time, in addition to the above-noted connections in the circuit of FIG. 9 being made, power supply to the drive forwarding roll 135 associated with the lower cassette 50 is stopped, while that to drive the forwarding roll 134 associated with the upper cassette 48 is maintained, whereby upon actuation of the forwarding roll drive means (not shown), only copy paper from the upper cassette 48 is forwarded to the transport system 46. Similarly, the selection switch SW-S is moved to the lower terminal b in order to select the lower cassette 50, and in this case, drive connections to the forwarding roll 134 are cut, while those to the forwarding roll 135 are maintained. Alternatively, the forwarding rolls 134 and 135 may be caused to move out of contact with the copy paper in their respective cassettes when they are required to remain unactuated.

Referring again to FIG. 9, in which switch positions shown are those established when the cassette selection switch SW-S is set to select the lower cassette 50, a cassette containing B5 size copy paper is in the upper position in the photocopying machine and is disposed to permit lengthways forwarding of copy paper therefrom for production of reduced-magnification photocopies, and a cassette containing A4 size copy paper is in the lower position, and is disposed to permit sideways forwarding of copy paper therefrom, the line 202 is connected through the line 204 and the switch SW-E to the otherwise unconnected b terminal of a switch 1T1, which together with switches lT2 and lT3 is controlled by a relay R1, which is connected to one side of the armature of the earlier described motor 104 for driving the lens assembly 26, and the a terminal of which is connected to the line 206. The other side of the armature of the motor 104 is connected to the switch 1T2 which is connectable via the b terminal thereof to the line 206 and via the a terminal thereof to the b terminal of the switch SW-R. The switch SW-R is connected via a line 208 to the line 202 and the a terminal thereof is connected through a lamp PL1 to the line 206. The lamp PL1 is provided together with lamps PL2 to PL5 on the exterior of the photocopying machine. The lamp PL1 serves to indicate that the photocopying machine is set to effect production of photocopies at reduced magnification, and lamps PL2 to PL5 serve to indicate use of copy paper of particular sizes in the production of photocopies.

The switch 1T3 is connected via line 210, to line 216 and the b terminal thereof is connected to the line 206 via a parallel connection including a diode and solenoid 100, also shown in FIG. 3, for causing engagement of the elements of the clutch means 96 to cause transport of the scanning systems 62 and 68 at requisite speeds for production of photocopies of the same size as the original documents, and the a terminal thereof is connected to the line 206 via a parallel connection including a diode and solenoid 102 actuable to cause transport of the scanning systems 62 and 68 at requisite speeds for production of reduced magnification photocopies. The diodes in parallel to solenoids 100 and 102 are provided to prevent reverse flow of excitation current through the respective solenoids.

The above-described line 214 connected to the b terminal of cassette selection switch SW-S is connected, through switch SW-5 and a diode in series with switch SW-5, to upper end of a parallel connection which includes a relay R2 and a reverse voltage prevention diode in parallel and the lower end of which is connected to the line 206. The line 214 is similarly connected via the switch SW-6 and a series diode to the upper end of a parallel connection including a relay R3 and a reverse voltage prevention diode in parallel and having a lower end connected to the line 206. The relay R2 serves to actuate switches 2T1 to 2T4 and the relay R3 to actuate switches 3T1 and 3T2, described below.

The line 212 connected to the a terminal of the cassette selection switch SW-S is connected, via the switch SW-2 and a series diode, to the upper end of the parallel connection including the relay R2, and via the switch SW-3 and series diode, to the upper end of the parallel connection including the relay R3.

The lines 216 and 218 respectively connected to the a terminal and to the b terminal of the cassette selection switch SW-S have provided thereon reverse current prevention diodes, and lead to the switches SW-1 to SW-4 respectively.

The a terminals of the switches SW-1 and SW-4 are both connected to the switch 3T1, and the b terminals thereof both connect to the switch 3T2. The a terminal of the switch 3T1 is connected to the switch 2T1 and the b terminal thereof to the switch 2T2. The a terminal of the switch 3T2 is connected to the switch 2T3 and the b terminal thereof to the switch 2T4.

The a terminal of the switch 2T1 is an open terminal and the b terminal thereof is connected via the lamp PL4 to the line 206. The a terminal of the switch 2T2 is connected via the lamp PL5 to the line 206, and the b terminal thereof is connected via the lamp PL4 to the line 206 and also via a line including a diode to a line 220 leading to the upper end of a parallel connection which includes the above-mentioned relay R1 and a reverse voltage prevention diode in parallel and the lower end of which is connected to the line 206.

The a terminal of the switch 2T3 is connected via the lamp PL2 to the line 206 and also via a line including a diode to the line 220. The b terminal of the switch 2T3 is connected via the lamp PL3 to the line 206. The a terminal of the switch 2T4 in connected via the lamp PL2 to the line 206, and the b terminal thereof is an open terminal.

With the above-described setting of the cassette selection switch SW-S and use of the above-described cassettes, presuming the lens assembly 26 is in the right-hand position shown in FIG. 3, to effect production of a photocopy of the same size as the original document, the switch SW-E is open and action of the circuit of FIG. 9 is as follows. Since a cassette containing copy paper of A4 size is in the lower position so as to cause closure of the switch SW-3, and the selection switch Sw-S is closed on the b terminal thereof, the relay R2 is energized and the switches 2T1 to 2T4 are switched to their respective a terminals. Since both of the switches SW-3 and SW-6 are open, the power supply circuit of the relay R3 is open, and therefore the switches 3T1 and 3T2 are switched to their respective b terminals. Therefore, the power supply circuit of the relay R1 is open both at the switch 2T2 and at the switch 3T2, and the switches 1T1 to 1T2 are switched to their respective b terminals. Although the switch SW-R is switched to the b terminal, the power supply circuit of the motor 104 is open, since the switch 1T2 is switched to the b terminal and the switch SW-E is open, and the lens assembly 26 therefore remains in the right-hand position contacting the switch SW-E.

Since a cassette containing copy paper of B5 size is set lengthways in the upper position, the switch SW-1 is switched to the a terminal.

Since the selection switch SW-S is switched to the b terminal, the switches SW-4 and 3T2 are switched to the respective b terminals, and the switch 2T4 is switched to the a terminal and the lamp PL2 is lit, to indicate use of copy paper of A4 size. The other lamps, however, remain unlit, the power supply circuit of the lamp PL1 being open at the switch SW-R, that of the lamp PL3 being open at the switch 2T3, that of the lamp PL4 being open at the switch 2T2, and that of the lamp PL5 being open at the switch SW-2. As will be made clear from the description below, the lamps PL3, PL4, and PL5 are selectively lit to indicate use of copy paper of B4 size, B5 size, and A3 size, respectively.

As noted earlier, the result of switching of the selection switch to the b terminal is also that copy paper can be forwarded only from the lower cassette. The switch 1T3 being switched to the b terminal, the solenoid 100 is energized and the solenoid 102 is de-energized. Therefore when actuation of the photocopying machine commences, the first scanning system 68 is moved at a speed V, and an equal-magnification copy is obtained.

After this, if it is required to obtain a reduced magnification copy from B4 to B5 size, the selection switch SW-S is switched to the a terminal, in order to select copy paper from the upper cassette. Thereupon, the power supply circuit of the relay R2 is opened at the switch SW-2, and the switches 2T1 to 2T4 are therefore switched to the respective b terminals. The positions of the switches 3T1 and 3T2 remain unchanged, since the power supply circuit of the relay R3 is still open at the switches SW-3 and SW-6, and also at the switch SW-S, but the power supply circuit of the relay R1 is now closed via the switches 2T2, 3T1, SW-1, and SW-5, and the switches 1T1 to 1T3 are therefore switched to the respective a terminals. The switches 1T1 and 1T2 being switched to the a terminals, the power supply circuit of the motor 104 is closed via the switches SW-R, 1T1, and 1T2, and the motor 104 is actuated to cause the lens assembly 26 to move leftwards as seen in FIG. 3 until the lens assembly 26 comes into contact with the switch SW-R and causes the switch SW-R to move to the a terminal thereof, whereupon the power supply circuit of the motor 104 is opened, and the lens assembly 26 stops in a required position. Also, when this position is reached by the lens assembly 26, the lamp PL1 lights up, to indicate that the photocopying machine is set for production of reduced magnification photocopies, since the power supply circuit is closed via the switch SW-R. Further, when the lens assembly 26 starts moving leftwards, the switch SW-E closed.

The switch 1T3 being switched to the a terminal, the solenoid 100 is de-energized and the solenoid 102 is energized, whereby the speed of the transmission systems 62 and 68 is increased by $\sqrt{2}$ during actuation of the photocopying machine. The lamp PL2 goes out, as the power supply circuit thereof is now open at the switch 2T4, and the lamps PL3 and PL5 remain unlit. The lamp PL4, however, lights, to indicate use of copy paper of B5 size, since the power supply circuit of the lamp PL4 is now closed via the switches 2T2, 3T1, SW-1, and SW-S.

If the switch SW-S is subsequently switched to the b terminal again, the positions of the switches controlled by the relays R1 and R3 return to those shown in the drawing, and the power supply circuit of the motor 104 is now closed via the switches SW-E, 1T1, and 1T2, polarity of voltage across the motor 104 being reverse to that effected by the circuit closure connections described above, and the motor 104 is actuated to cause the lens assembly 26 to move rightwards as seen in FIG. 3, until the lens assembly comes into contact with and opens the switch SW-E, whereupon the power supply circuit of the motor 104 is opened and the lens assembly 26 stops, with the solenoid changed over to copying at the equal magnification.

Although the foregoing description is mainly given with reference to the copying of A4 size equal magnification and B5 size reduced scale copying, it may be readily seen that similar action is achieved even when cassettes containing copy paper of sizes according to various other specifications are set in the photocopying machine. In the foregoing embodiment, the cassette containing copy paper of the particular size is set lengthways for the reduced scale copying from the intial stage, but when it is required to effect the reduced scale copying on one of the sizes of copy paper contained in two cassettes placed sideways on the upper and lower cassette holders, the variable magnification mechanism is actuated only by arranging the cassette lengthways to establish the condition for the reduced scale copying.

It should be noted here that various modifications in the scanning means of the original document, such as a movable document rest type, full frame exposure type, etc., or changes in the detection mechanism are included within the scope of the present invention.

It should also be noted that in the foregoing embodiment, although the present invention is mainly described with reference to the reduced scale copying with a reduction to one half, reduction in magnification by more than one half is readily effected by the arrangement according to the present invention and should be construed as included within the scope of the invention.

As is clear from the foregoing description, in the present invention, since it has been made possible to arrange the cassettes lengthways and sideways with respect to the direction of transportation of the copy paper sheet, the entire surface of the copy paper sheet can be fully utilized without wasting a portion even in the variable magnification copying. Furthermore, when the variable magnification mechanism is actuated by detection of the direction in which the cassettes are attached, efficient utilization of the copy paper sheet is achieved by a simple operation.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A photocopying machine equipped with a variable magnification arrangement for effecting production of photocopies on copy paper sheets of rectangular configuration at magnification equal to the size of an original document to be copied at magnification on a reduced scale from the original document, said photocopying machine comprising at least one cassette holding member provided on the main body side of said photocopying machine, said cassette holding member being adapted to receive thereon a first cassette lengthways and to receive thereon a second cassette selectively lengthways and sideways with respect to the direction of the transportation of the copy paper sheets, said first cassette accommodating therein the copy paper sheets of first size which is equivalent to the maximum reproducible size, said second cassette accommodating therein the copy paper sheet of second size the long side of which is shorter than the short side of the copy paper sheet of the first size, so that said second cassette is placed on said cassette holding member sideways for the copying at the equal size magnification and lengthways at the reduced size magnification with respect to the direction of transportation of the copy paper sheets.

2. A photocopying machine as claimed in claim 1, wherein said first and second cassettes are each provided at three corner portions thereof with multi-feeding preventing members for the copy paper sheets.

3. A photocopying machine equipped with a variable magnification arrangement for effecting production of photocopies on copy paper sheets of rectangular configuration at magnification equal to the size of an original document to be copied and magnification on a reduced scale from the original document, said photocopying machine comprising at least one cassette holding member provided on the main body side of said photocopying machine, said cassette holding member being adapted to receive thereon a first cassette lengthways and to receive thereon a second cassette selectively lengthways and sideways with respect to the direction of the transportation of the copy paper sheets, said first cassette accommodating therein the copy paper sheet of first size which is equivalent to the maximum reproducible size, said second cassette accommodating therein the copy paper sheet of second size the long side of which is shorter than the short side of the copy paper sheet of the first size, means for changing over the magnification of the variable magnification arrangement, and detecting means for actuating said magnification changing over means to be in a first state for copying at said equal size magnification when said second cassette is placed sideways and to be in a second state for copying at the reduced size magnification when said second cassette is placed lengthways on said cassette holding member, said changing over of the magnifications being effected by changing orientations of said second cassette to be placed on said cassette holding member.

4. A photocopying machine as claimed in claim 3, wherein said first and second cassettes are each provided at three corner portions thereof with multi-feeding preventing members for the copy paper sheets.

5. A photocopying machine as claimed in claim 3, wherein said detecting means further includes more than one switch actuating element provided in each of said first and second cassettes, and more than one switch provided in the main body of the photocopying machine, said switches being closed or opened by said switch actuating elements when said second cassette is placed on said cassette holding member for actuating said magnification changing over means.

6. A photocopying machine equipped with a variable magnification arrangement for effecting production of photocopies on copy paper sheets of rectangular configuration at magnification equal to the size of an original document to be copied and magnification on a reduced scale from the original document, said photocopying machine comprising at least one cassette holding member provided on the main body side of said photocopying machine, said cassette member being adapted to receive thereon a first cassette lengthways and to receive thereon a second cassette lengthways and sideways with respect to the direction of the transportation of the copy paper sheets, said first cassette accommodating therein the copy paper sheet of first size which is equivalent to the maximum reproducible size, said second cassette accommodating therein the copy paper sheet of second size the long side of which is shorter than the short side of the copy paper sheet of the first size, said first and second cassettes being each provided at three corner portions thereof with copy paper multi-feeding preventing members, means for changing over the magnifications of the variable magnification arrangement, and detecting means for actuating said magnification changing over means to be in a first state for the copying at said equal size magnification when said second cassette is placed sideways and to be in a second state for the copying at the reduced size magnification when said second cassette is placed lengthways on said cassette holding member, said changing over of the magnifications being effected by changing orientations of said second cassette to be placed on said cassette holding member, said detecting means including more than one switch actuating element provided in each of said first and second cassettes, and more than one switch provided in the main body side of the photocopying machine, said switches being closed or opened by said switch actuating elements when said second cassette is placed on said cassette holding member for actuating said magnification changing over means.

* * * * *